United States Patent
Fujita et al.

[11] Patent Number: 6,130,734
[45] Date of Patent: Oct. 10, 2000

[54] COLOR LCD HAVING PARTICULAR PARAMETERS FOR LC LAYER, RETARDER, COLOR POLARIZER ALIGN LAYER

[75] Inventors: Hiroyuki Fujita; Mitsuyoshi Hara; Takayoshi Hanami; Naofumi Yamauchi, all of Chiba, Japan

[73] Assignee: Seiko Instruments Inc., Japan

[21] Appl. No.: 08/873,789

[22] Filed: Jun. 12, 1997

[30] Foreign Application Priority Data

Jun. 14, 1996 [JP] Japan ..................................... 8-005574

[51] Int. Cl.$^7$ .............................. G02F 1/1335; G02F 1/13
[52] U.S. Cl. ............................ 349/97; 349/117; 349/181
[58] Field of Search ............................. 349/97, 101, 102, 349/117, 121, 181

[56] References Cited

U.S. PATENT DOCUMENTS

| | | | |
|---|---|---|---|
| 4,984,874 | 1/1991 | Yamamoto et al. | 349/117 |
| 5,124,824 | 6/1992 | Kozaki et al. | 349/117 |
| 5,325,218 | 6/1994 | Willet et al. | 349/97 |
| 5,550,660 | 8/1996 | Yang | 349/117 |
| 5,751,385 | 5/1998 | Heinze | 349/61 |
| 5,838,408 | 11/1998 | Inoue et al. | 349/118 |

*Primary Examiner*—William L. Sikes
*Assistant Examiner*—Toan Ton
*Attorney, Agent, or Firm*—Adams & Wilks

[57] ABSTRACT

A liquid crystal device comprises a liquid crystal cell having a liquid crystal material sandwiched between a pair of substrates, the liquid crystal material having a retardation less than 1 μm, a polymer film comprised of an optically anisotropic substance disposed on one of the substrates opposite the liquid crystal material, a color polarizing plate disposed on the polymer film opposite the one substrate, and a polarizing plate disposed on the other of the substrates opposite the liquid crystal material. The liquid crystal material preferably comprises a super twisted nematic liquid crystal material, and the color polarizing plate preferably comprises a red, green or blue polarizing plate.

3 Claims, 1 Drawing Sheet

COLOR LCD HAVING PARTICULAR PARAMETERS FOR LC LAYER, RETARDER, COLOR POLARIZER ALIGN LAYER

BACKGROUND OF THE INVENTION

The present invention relates to a liquid crystal display device.

Conventionally, a TN (twisted nematic) type liquid crystal display device or an STN (super twisted nematic) type liquid crystal display device has been utilized as a medium-sized or small-sized liquid crystal display device used for a portable apparatus or the like. The TN type liquid crystal display device is composed of a liquid crystal cell in which liquid crystal molecules are twist-oriented at a twist angle of about 90° and a pair of polarizing plates disposed so as to hold the liquid crystal cell therebetween. The display colors are black and white.

Further, the STN type liquid crystal display device is composed of a liquid crystal cell in which liquid crystal molecules are twist-oriented at a twist angle within the range of 180° to 270° and a pair of polarizing plates disposed so as to hold the liquid crystal cell therebetween. There are some known cases in which at least one polymer film of an optically anisotropic substance is disposed between the liquid crystal cell and the polarizing plate. The display colors are any of yellow and green, purple and white, or black and white.

The display colors of such conventional liquid crystal display devices have been restricted as mentioned above. Particularly, displaying black on a white background does not match the design and color of an outer case.

SUMMARY OF THE INVENTION

In view of the above, an object of the present invention is to provide a structure in which setting of display colors can be easily made. In order to achieve the above object, the structure is designed such that a liquid crystal cell in which liquid crystal molecules are twist-oriented at a twist angle in the range of 180° to 270° is held between a color polarizing plate and a polarizing plate, and a polymer film of an optically anisotropic substance is disposed in at least one of the spaces between the liquid crystal cell and the color polarizing plate or between the liquid crystal cell and the polarizing plate. According to this structure, the color of the color polarizing plate can be displayed instead of displaying black.

DETAILED DESCRIPTION OF THE PREFERRED EMBODIMENTS

Figure 1:
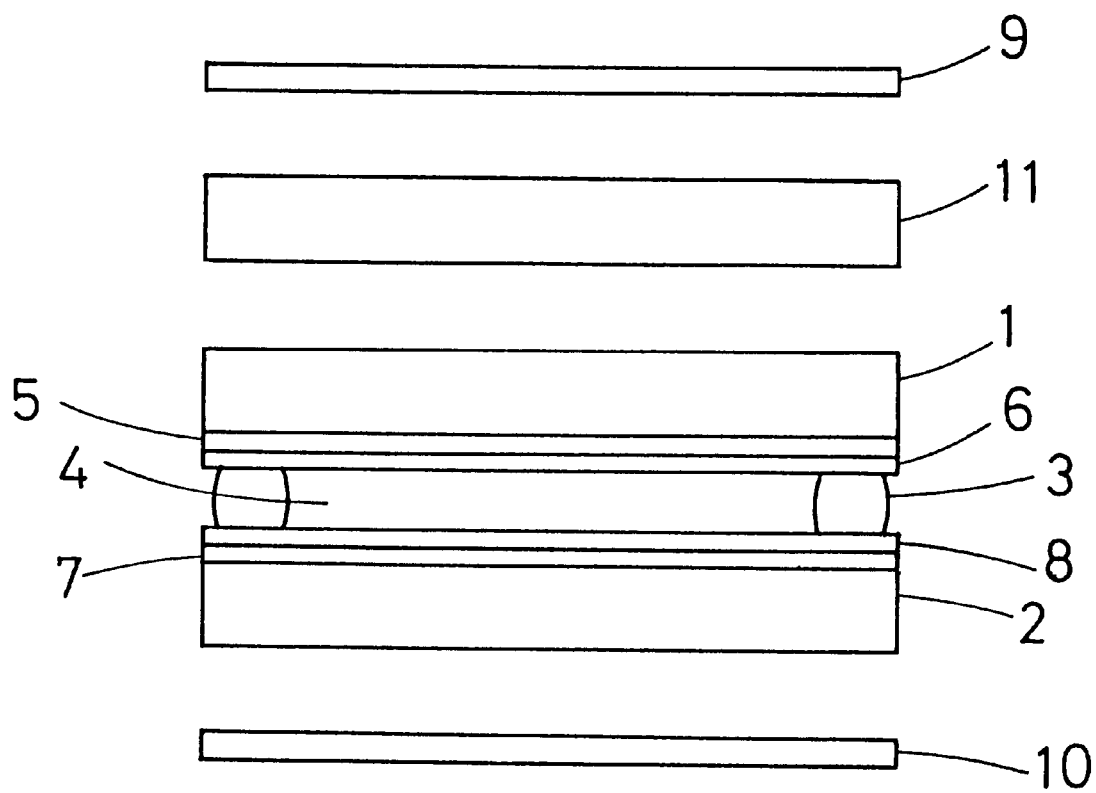
FIG. 1 is a schematic sectional view showing a basic structure of a liquid crystal display device according to the present invention.

Preferred embodiments of the present invention will be described in detail with reference to the drawing.

EXAMPLE 1

FIG. 1 is a schematic sectional view showing a basic structure of a liquid crystal display device according to the present invention. The liquid crystal display device is formed of a pair of upper and lower glass substrates 1 and 2, which are coupled to each other with predetermined intervals therebetween through a sealing material 3. A super twisted nematic liquid crystal material 4 with a positive dielectric anisotropy is held in the space formed therebetween. A transparent electrode 5 and an orientation film 6 are formed on the inner surface of the upper glass substrate 1. The transparent electrode 5 is, for example, patterned into stripes in the row direction. The orientation film 6 is formed of, for example, polyimide and is rubbed in a predetermined direction to form an orientation surface. Also, a transparent electrode 7 and an orientation film 8 are formed on the inner surface of the lower glass substrate 2. The transparent electrode 7 is, for example, patterned into stripes in the column direction. The orientation film 8 is also made of polyimed or the like and is rubbed in a predetermined direction to form an orientation surface.

The thus formed liquid crystal cell is held between a color polarizing plate 9 and a polarizing plate 10 with a reflecting plate from the upper and lower sides. A polymer film 11 of an optically anisotropic substance intervenes between the upper glass substrate 1 and the color polarizing plate 9. The polymer film 11 is, for example, made of a uniaxial drawn film of polycarbonate.

In this example, the distance between the pair of upper and lower glass substrates 1 and 2 is 6.3 $\mu$m. The nematic liquid crystal 4 has a refractive index anisotropy $\Delta n$ of 0.13. The retardation of the liquid crystal material 4, which is the product of the distance of 6.3 $\mu$m between the glass substrates 1 and 2 and the refractive index anisotropy $\Delta n$ of 0.13 of the liquid crystal 4, is 0.819 $\mu$m. The twist angle is 240°. Here, the rubbing direction of the upper glass substrate 1 was 30°, and the rubbing direction of the lower glass substrate was 330°. The twist angle may be selected within the range of 180° to 270° as in a conventional case. For ease of description, all angles are based on a standard convention, in which the rightward direction of the abscissa is the 0° reference axis and the positive direction is counterclockwise as viewed from above.

The retardation of the polymer film 11 was 570 nm. The direction of a drawn axis is 35° to 75°, preferably 45° to 65°, more preferably 55°. NPF-Q-10R made by NITTO DENKO CORPORATION was used as the color polarizing plate 9. The angle of a transmission axis is 80° to 120°, preferably 90° to 110°, more preferably 100°. PF-F3205M made by NITTO DENKO CORPORATION was used as the polarizing plate 10 with the reflecting plate. The angle of a transmission axis is 50° to 90°, preferably 60° to 80°, more preferably 70°.

One of the features of the present invention is to use the polymer film 11 and the color polarizing plate 9. According to this structure, displaying white on a red background becomes possible.

Although the example of the reflective type liquid crystal display device has been described, a semi-transmitting type liquid crystal display device using a semi-transmitting polarizing plate instead of the polarizing plate 10 with the reflective plate, or a transmitting type liquid crystal display device using only a polarizing plate may be used. Further, if the angle of the color polarizing plate 9 or the polarizing plate 10 with the reflective plate is changed, it is also possible to display red on a white background.

EXAMPLE 2

NPF-Q-10G made by NITTO DENKO CORPORATION was used as the color polarizing plate 9 in the same structure as in the example 1. According to this structure, it became possible to display white on a green background.

EXAMPLE 3

NPF-Q-10B made by NITTO DENKO CORPORATION was used as the color polarizing plate 9 in the same structure as in the example 1. According to this structure, it became possible to display white on a blue background.

As described above, according to the present invention, it is possible to display white on the red background, white on the green background, and white on the blue background in the liquid crystal display device. Especially, when the present invention is applied to a portable product with a colorful outer case such as a portable telephone, personal handy-phone, pocket bell and PDA in which a liquid crystal display device is frequently used in a private product market, the commodity value of the product is increased.

What is claimed is:

1. A liquid crystal device comprising; a liquid crystal cell having a liquid crystal material sandwiched between a pair of substrates, the liquid crystal material being comprised of a super twisted nematic liquid crystal material having a retardation of 819 nm; a polymer film comprised of an optically anisotropic substance disposed on one of the substrates opposite the liquid crystal material, the polymer film having a retardation of 570 nm; a color polarizing plate disposed on the polymer film opposite the one substrate; and a polarizing plate disposed on the other of the substrates opposite the liquid crystal material.

2. A liquid crystal device comprising; a liquid crystal cell having a liquid crystal material sandwiched between a pair of substrates, the liquid crystal material having a retardation less than 1 $\mu$m; a polymer film comprised of an optically anisotropic substance disposed on one of the substrates opposite the liquid crystal material; a color polarizing plate disposed on the polymer film opposite the one substrate; and a polarizing plate disposed on the other of the substrates opposite the liquid crystal material; wherein the color polarizing plate has a transmission axis angle within a range of 80° to 120°, the polymer film has a drawn axis angle within a range of 35° to 75°, the one substrate has a rubbing angle of 30°, the other substrate has a rubbing angle of 330°, and the polarizing plate has a transmission axis angle within a range of 50° to 90°, all angles being measured from an abscissa as a 0° reference axis.

3. A liquid crystal device according to claim 2; wherein the color polarizing plate comprises a red, green or blue polarizing plate.

* * * * *